Jan. 3, 1928.
T. JENSEN
1,655,101
AUTOMOTIVE DRIVE
Filed April 12, 1926
3 Sheets-Sheet 2
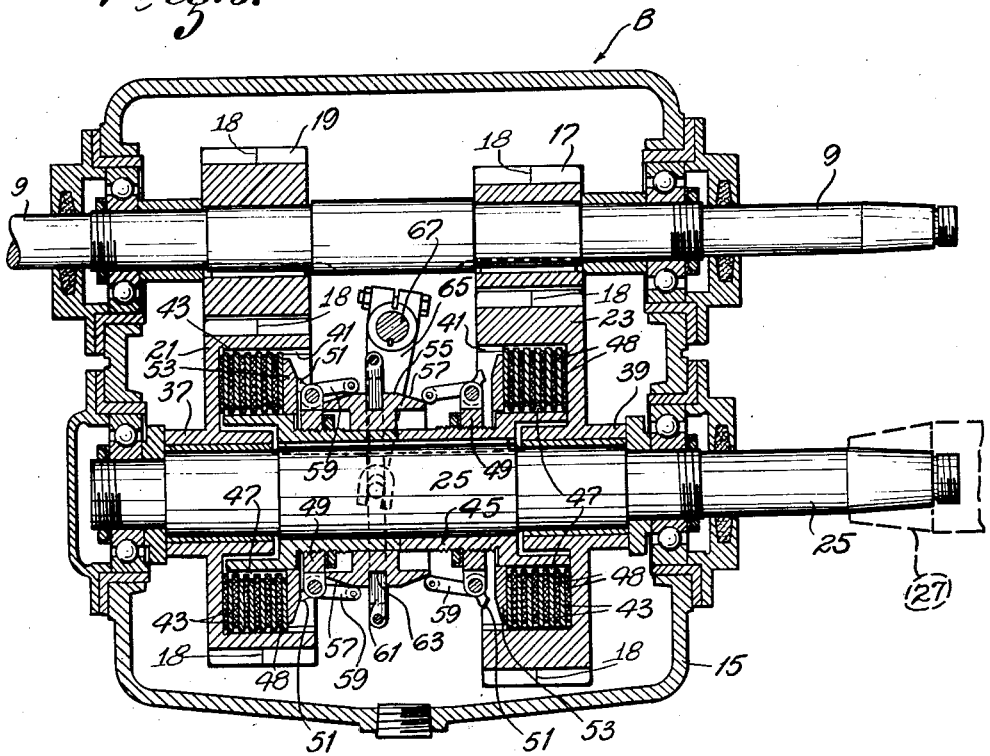
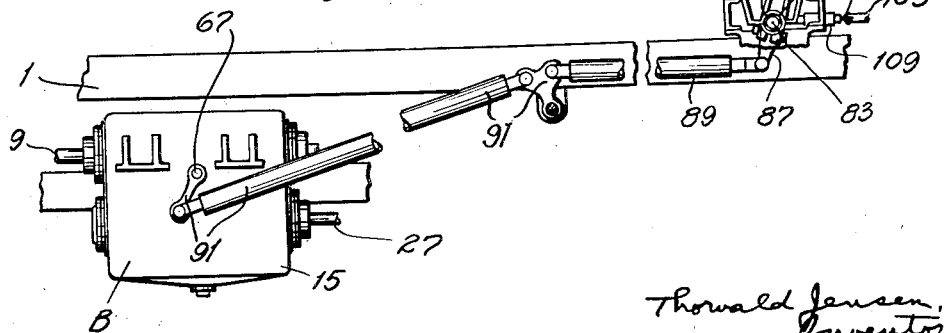

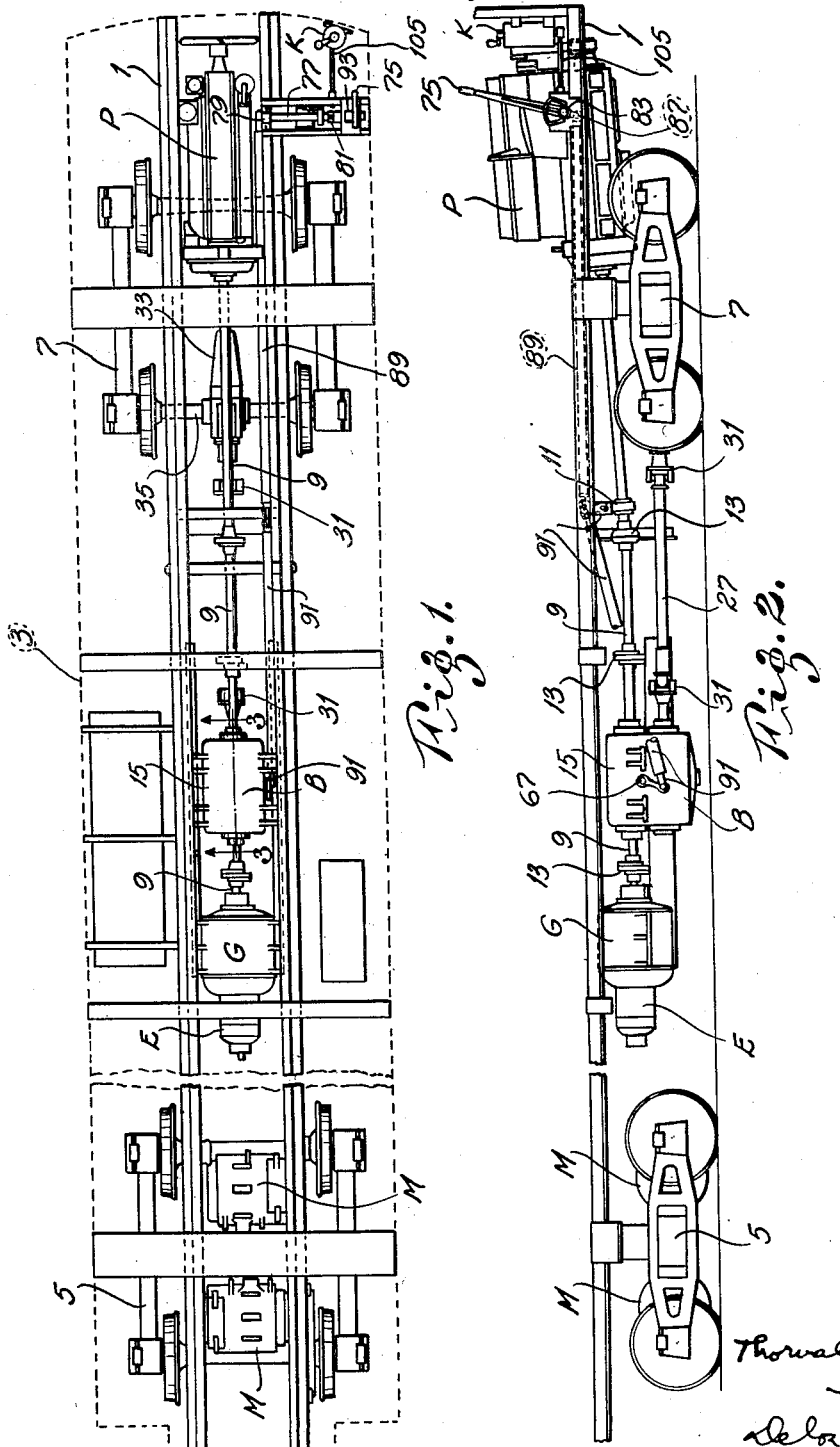

Jan. 3, 1928. 1,655,101
T. JENSEN
AUTOMOTIVE DRIVE
Filed April 12, 1926 3 Sheets-Sheet 3

Patented Jan. 3, 1928.

1,655,101

UNITED STATES PATENT OFFICE.

THORVALD JENSEN, OF ST. LOUIS, MISSOURI.

AUTOMOTIVE DRIVE.

Application filed April 12, 1926. Serial No. 101,603.

This invention relates to automotive drives and with regard to certain more specific features to a combined electrical and mechanical automotive drive.

Among the several objects of the invention may be noted the provision of a drive adapted to be selectively set to drive either electrically or mechanically; one which has selective speeds for direct mechanical connection thereof; a drive having the said selective mechanical speed connections but which does not necessitate moving gears into and out of mesh; the provision of a drive of the class described having safety interlock features whereby proper operation is insured; and the provision of a drive of the class described which permits of the most economical design and operation of its component elements. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings in which is illustrated one form of the invention,

Fig. 1 is a plan view of a chassis upon which are mounted the elements of the invention;

Fig. 2 is a side elevation of Fig. 1;

Fig. 3 is a vertical section taken on line 3—3 of Fig. 1 and illustrates a mechanical transmission.

Fig. 4 is a fragmentary side elevation showing certain details of a shifter linkage;

Similar reference characters indicate corresponding parts throughout the several views of the drawings.

Figure 5:
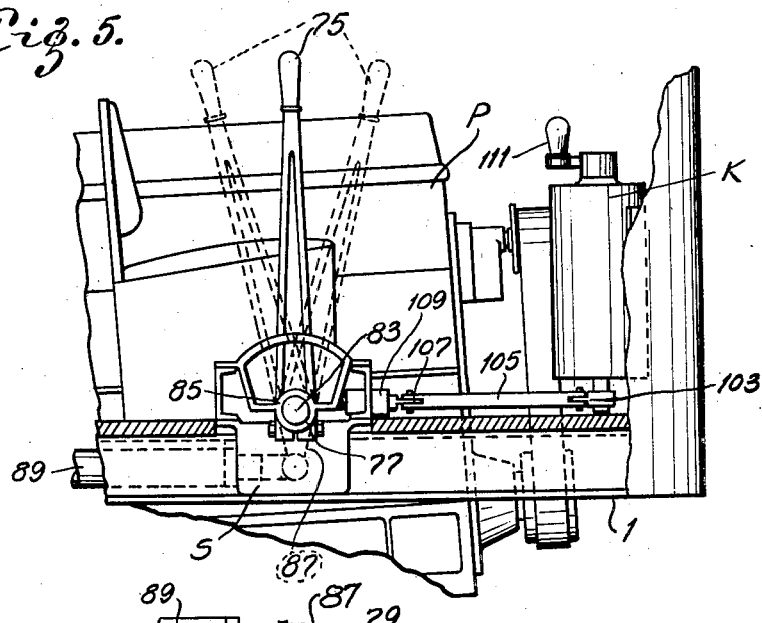
Fig. 5 is a side elevation of a group of interlocking control elements shown in neutral positions by solid lines and in other alternate positions by dotted lines.

Referring now more particularly to Fig. 1, there is illustrated a chassis 1 adapted to receive a body 3 thereon for the usual purposes of carriage. The chassis 1 is mounted on running trucks 5 and 7. These trucks are illustrated in the present example as being adapted to be used on railways and the like. It is to be understood that they may also comprise the running gear of road and like vehicles.

A prime mover P, preferably of the internal combustion type, is mounted on said chassis and is adapted to be started from a conventional starting system and to be controlled by conventional ignition and fuel throttles or controls. An internal combustion type of prime mover is preferred because of its economy of operation. The present invention overcomes the disadvantages inherent in operating internal combustion engines, such as the necessity for shifting teeth of gears to make an engine's limited effective speed-torque range usable at all vehicle speeds. Smoother starting is also had but not at the expense of decreased economy at higher speeds. From the above it is evident that any type of prime mover having speed-torque characteristics analogous to those of the internal combustion engine may be used to advantage with the present invention, such as for instance a turbine.

The prime mover P is mechanically connected with an electric generator G by means of drive shafting 9. The shafting 9 is provided with the proper conventional supports 11 and universal joints 13. It passes directly through a shifter box B. There is no means provided in the shafting 9 for mechanically disconnecting the generator G from the prime mover P, that is, while the coach is in operation. The units P and G revolve at a common speed.

The box B comprises a housing 15 mounted on the chassis 1. The drive shafting 9 passes therethrough and is provided within the box B with two herringbone pinions 17 and 19. The herringbone construction of these pinions is indicated in the conventional manner by the vertical lines 18 shown on the teeth thereof. The pinions 17 and 19 are keyed fast to the shafting 9 and always rotate with it. The pinion 19 has a greater number of teeth than pinion 17. The pinions 17 and 19 mesh with herringbone gears 23 and 21 respectively, the latter gears being carried rotatably on a section 25 of a line of propeller shafting 27. The line 27 is also provided with proper joints 31 and is geared at a housing 33 to one axle 35 of the forward truck 7. This is for mechanical driving purposes.

Referring again to the box B, it may be noted that the gears 21 and 23 are provided with hubs 37 and 39 respectively, properly bushed in order to decrease wear. The gears 21 and 23 have numbers of teeth such that they properly mesh with said pinions, that is, gear 21 is smaller than gear 23. The gear reduction from the pinion 17 to the gear 23 is greater than that from the pinion 19 to the gear 21.

Each of the gears 21 and 23 is provided with a clutch unit whereby it may be mechanically joined with the shaft 25. In the present example the said gears are formed hollow and are provided with internal splines 41 adapted to slidably but non-rotatably receive a set of driving clutch discs 43. Keyed to the shaft 25 is a driven drum 45 provided with sets of splines 47. These splines 47 slidably but non-rotatably carry a set of driven clutch discs 48. Each gear 21 and 23 is provided with a clutch element comprising a set of driving discs 43 on the gear and a set of driven discs 47 in connection with the drum 45. Hence if the set of discs are frictionally engaged, the respective gear 21 or 23 will be mechanically connected with the propeller shaft 25. Such connection is made alternative with respect to said gears.

Means for alternatively closing and opening the said clutch elements comprises spiders 49 juxtapositioned one each near the clutch members, and adjustably locked to the drum 45. These spiders pivotally carry shifter dogs 51 adapted to movably engage pressure plates 53. The plates 53 are slidably splined with the drum 45. Between the spiders 49 and slidably carried on the drum 45 is a barrel cam 55. This cam 55 has sloping portions 57 adapted to engage and spread fingers 59 which are integrally formed with said dogs 51. Motion of the barrel cam 55 in one direction causes closing of one clutch and opening of the other, and vice versa, if the direction of motion is reversed.

In order to operate the cam 55 back and forth, a yoke 61 engages a groove 63 thereof. This yoke is operable from a shifter fork 65 fastened to a cross shaft 67 which passes outwardly of the box B to be manually operated from the proper linkages to be described. It is evident that the speed ratio between the shafting 9 and 25 may be varied merely by changing clutch engagements. If the driving engagement between the shafts 9 and 25 is by way of the gears 19 and 21 and the clutch associated therewith, then the speed of the shaft 25 is nearer that of the shaft 9, than when the driving engagement is by way of the gears 17 and 23 and the clutch associated therewith. Driving through gears 19 and 21 comprises connection in high direct gear, while that through gears 17 and 23 comprises connection in low direct gear, the respective connections being utilized during the period of mechanical driving. The drive shaft 27 rotates with and at the speed of shaft 25.

It is to be understood that the cam 55 can take a mid-position in which neither of the clutches are closed. If cam 55 is in its mid-position no mechanical drive is had from shafting 9 to shafting 27 and idling conditions prevail, if the generator G is simultaneously prevented from feeding energy to the electrical driving motors of the coach.

Figure 7:
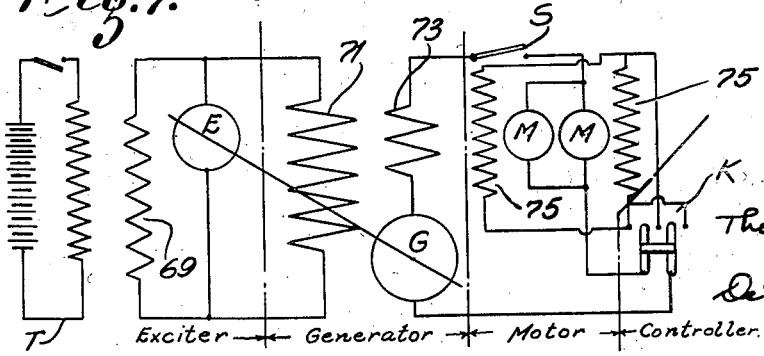
Fig. 7 is a wiring diagram.

The motors M for electrically driving are mounted on the truck 5 and are conventionally geared to the axles thereof. They are wired in the generator circuit as illustrated in Fig. 7.

The generator G and exciter E are preferably directly connected having armatures on a common quill. Fig. 7 illustrates the wired connections comprising a teaser circuit T adapted to be manually closed when the prime mover is first started for the purpose of teasing the exciter shunt field 69 to pose magnetization. After the exciter E gets into electrical operation, the teaser circuit T may be opened. At numeral 71 is indicated the generator shunt field and at 73 the generator series differential field. The motors M are connected in parallel in the generator circuit, as well as are their fields 75. An automatic oil switch S is adapted to open the motor circuit, and a controller K is adapted to reverse the direction of current through the motor fields. The controller K is adapted to reverse the direction of motor rotations for a given generator rotation. It is evident that if, while the prime mover P and generator G are rotating, the switch S be closed, (the controller K in forward or reverse position) the motors M will receive electrical energy from the generator G and will rotate to drive the coach from the truck 5. This electrical connection for driving results in electrical starting and should take place only when the said clutch elements in the box B are both open.

It is intended that the coach shall be started electrically and after the highest starting acceleration is completed to be driven mechanically from the prime mover P, first, through the low direct speed gears 17, 23, and then through the high direct speed gears 19, 21. This restricts the use of the electrical drive to starting conditions only, that is, where high starting torques are needed, and provides an economical mechanical drive at all operating speeds including those on heavy grades where a lower gear is required.

In order to accomplish the described speed shifts a lever 75 is provided on an internally splined shaft 77 which is slidably and rotatably borne in two bearings 79 and 81. The shaft 77 is hollow and its internal splines cooperate with the external splines of an internal shaft 83. The shaft 83 is rotatably borne in an extension 85 at said bearing 81 but is not laterally slidable. This shaft 83 is provided with a downwardly extending lever 87 for the purpose of having a drag link 89 jointed therewith. The drag link 89 controls a four bar linkage 91, the latter being adapted to oscillate the said shaft 67 in the gear box B. It is evident that by shifting the lever 75 forward and back, that either one of the said clutch elements may be engaged while the other is disengaged. The lever 75 has also a vertical neutral position in which both of the clutches are opened and in neutral position.

The casting comprising the bearing 81 and the extension 85 is provided with a T-shaped opening 93 having a cross slot 95 and a stem slot 97. The cross slot 95 is adapted to permit forward and rearward oscillations of the lever 75, but no sideward motion thereof when the lever is either in rearward or forward position. However when the lever is in vertical neutral position it may be thrown to one side into the stem slot 97. When so thrown it cannot be thrown forwardly or rearwardly. It is evident that when the lever 75 is thrown sidewardly, the shaft 77 is carried along with it, that is, it slides on the splined shaft 83 and in the bearings 79 and 81.

The switch S is located directly under the shaft 77. It is provided with a throwout linkage 99, one element of which is clamped to the said shaft 77. The linkage 99 is so arranged that when the lever 75 is thrown substantially into the bottom of the stem slot 97, then the switch will be caused to be closed. When the lever 75 is at or near the cross slot 95, then the switch S is adapted to be open.

The mode of operation is relatively simple. Electrical starting is accomplished by throwing the lever 75 into the slot 97 thereby closing the switch S. The lever 75 is vertical. When the switch S is closed (assuming that the generator units are producing current) the motors M receive current, whereby they are caused to rotate to drive the vehicle from the truck 5. The above is under the presumption that the controller K is in a forward position.

In order to shift from electrical to direct mechanical drive, the lever 75 is thrown over into slot 95 and for low mechanical gear is pulled rearwardly. It will be noted that this operation causes the switch S to automatically open. In order to shift to high mechanical drive, the lever 75 is thrown forwardly.

It is evident that with the above construction, only forward positioning of controller K should be started with, if a complete shift is to be made from an electrical through the mechanical connections. If an attempt is made to shift from electrical connections through the mechanical ones when the controller has been set to a reverse position, it is evident that the shaft 25 (Fig. 3) will be rotating in a direction opposite to that in which it should be rotating for a direct mechanical connection from the engine. Hence, in order to prevent throwing oppositely rotating parts into driving connection, it is desirable to have an interlock connection between the controller K and the shifting means above described.

The controller K comprises a conventional drum switch adapted to be set into position X for a forward connection of the motors M, into a position Y for an off or neutral connection, and into a position Z for reverse connection thereof. In order to prevent taking the lever 75 from the slot 97 when a reverse position of the controller K is had, there is provided on the shaft 77 a collar 101. On the lower end of the rotor of the controller K is provided an arm 103 to which is pivoted a connecting rod 105. The rod 105 is pivoted to a slidable link 107 held in a bearing 109.

Figure 6:
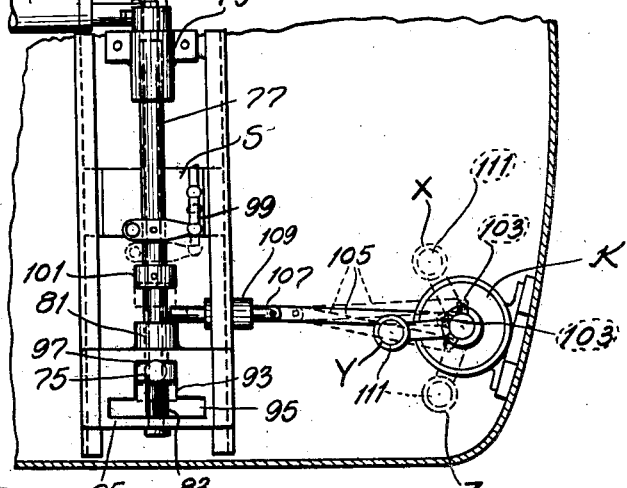
Fig. 6 is a plan view of Fig. 5 showing alternate positions of certain parts.

The lever 103 is so positioned on the rotor that at the forward positioning X of the handle 111 of the controller K, the member 107 does not interfere with the motion of the collar 101. The lever 75 may therefore be shifted from any one of its four positions to any other position. However, when the handle 111 is in an off or reverse position, Y or Z, then the lever 103 is so positioned that the member 107 is caused to interfere with the movement of the collar 101. The result is that if the lever 75 is set into the slot 97 for purposes of making the electrical connection, and then the controller is set to a reverse position, then it is impossible to bring the lever 75 back into a position from whence it can be thrown to either one of the direct mechanical speed connections, that is, without resetting the controller K to a forward position. The result is that all possible damage which might arise from shifting to mechanical drive from electrical drive when the latter is reversing the coach is prevented. The switch S is adapted to be opened when the lever 75 and parts therewith are in their dotted line positions indicated in Fig. 6, that is, before the lever 75 is in mechanical shift position. The position referred to is the one in which the controller interlock is just blocking further movement of the handle 75.

Complete operation of a coach employing the new drive is as follows:

The controller K is set into its forward position and the lever 75 into its neutral vertical position in the slot 95. The prime mover P is then started in the usual manner from a conventional starting arrangement. This causes the gears 17 and 19, as well as the generator G and its exciter E, to rotate. The gears 21 and 23 also rotate but transmit no movement to the shaft 25 because the clutch elements are open. The switch S is also open so that no energy flows from the generator to the motors M.

In order to accelerate the coach from a standstill it is preferable to use the electrical drive because of the easy starting conditions inherent therewith. Hence the lever 75 is thrown into the slot 97. This closes the switch S and energy may flow from the generator G to the motors M. The clutch elements are still open. It should be understood that the amount of energy fed from the generator G to the motors M is negligible when the prime mover idles. The result is that under these conditions the coach will not start. In order to start the vehicle the throttle or control for the prime mover P is set to a position to increase prime mover speed whereat enough energy flows from the generator G to the motors M to accelerate the vehicle. The electrical drive is used up to a speed of preferably about twenty-five miles per hour. After this it is desirable to obtain a direct mechanical drive because of the inherently wasteful operation of any electrical drive.

Next the intermediate or low direct drive is connected up by throwing the lever 75 out of the slot 97, into the slot 95 and then pulling it rearwardly. This causes the clutch associated with the gears 17 and 23 to close and the switch S to open. The result is that the generator is disconnected from the motors M and driving takes place from the prime mover through the shafting 9, gears 17 and 23, shafting 25 and 27 and to the front truck 7. The rear truck 5 is now idle as far as driving is concerned. This intermediate mechanical speed is adapted to take the velocity of the coach up to some forty to fifty miles per hour. From fifty to seventy-five or eighty miles per hour it is desirable to throw in the high speed mechanical drive. This is done by pushing the lever 75 directly forward into the slot 95. The clutch, built in connection with the gears 19 and 21, then closes while the said other clutch opens.

If reverse operation of the coach had been desired from a standstill position, it would only have been necessary to throw the handle 111 of the controller K to reverse position after the lever 75 had been put into electrical drive connection. Acceleration of the prime mover P would then have resulted in movement of the vehicle rearwardly at a velocity somewhat proportional to the rate of rotation of the prime mover, as governed from the throttle. The lever 75 could not have been inadvertently manipulated to be thrown to any mechanical connecting position because of the interference of the member 107 with the collar 101.

In order to make a stop from forward or backward electrical operation, it is only necessary to throttle the operation of the prime mover P until the amount of current generated is of such a negligible quantity as not to affect driving. The brakes may then be applied. An alternative method for stopping from forward electrical operation is to throw the lever 75 into or near to neutral vertical position and apply the brakes. This breaks the motor circuit at switch S. An alternative method for stopping during reverse electrical operation is to throw the controller K into an off position and apply the brakes. Another alternative is to set the lever 75 and switch linkage 99 into the Fig. 6 dotted line position as blocked by the interlock mechanism. This opens the switch S but prevents throwing the mechanical drive into operation. The latter methods each break the electrical circuit.

In order to make a stop from forward mechanical operation, (either high speed or low speed) the lever 75 is set to neutral vertical position and the brakes applied.

It should be noted that the gears are never unmeshed, whereby deleterious scraping at speed shifts is prevented. Herringbone or like gears are practically noiseless and highly efficient. They cannot be unmeshed by longitudinal movement. The plurality of speeds as herein provided cut down the size of various elements, economize fuel and yet provide ideal accelerating and running conditions.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A vehicle drive comprising in combination, a prime mover, a generator mechanically coupled therewith, a motor adapted to drive a vehicle and receive energy from the generator, mechanical means adapted to drive said vehicle, and means for mechanically imparting energy from the prime mover to said mechanical means in varying speed ratios, said last named means comprising a plurality of mechanical transmitting systems having opening clutches therein.

2. A vehicle drive comprising in combination, a prime mover, a generator mechanically coupled therewith, a motor adapted to drive a vehicle and receive energy from the generator, mechanical means adapted to drive said vehicle, and means for mechanically imparting energy from the prime mover to said mechanical means in varying speed ratios, said last named means comprising a plurality of mechanical transmitting systems having opening clutches therein adapted to be all opened or alternatively closed.

3. A vehicle drive comprising in combination, a prime mover, a generator mechanically coupled therewith, a motor adapted to drive a vehicle and receive energy from the generator, mechanical means adapted to drive said vehicle, and means for mechanically imparting energy from the prime mover to said mechanical means in varying speed ratios, said last named means comprising a plurality of mechanical transmitting systems having opening clutches therein adapted to be all opened or alternatively closed, a circuit for transmitting energy from the generator to the motor, means for closing said circuit, and means for preventing the closing of either of said clutches when the said circuit is closed.

4. A vehicle drive comprising in combination, a prime mover, a generator mechanically coupled therewith, a motor adapted to drive a vehicle and receive energy from the generator, mechanical means adapted to drive said vehicle, and means for mechanically imparting energy from the prime mover to said mechanical means in varying speed ratios, said last named means comprising a plurality of mechanical transmitting systems having opening clutches therein adapted to be all opened or alternatively closed, a circuit for transmitting energy from the generator to the motor, a switch for closing said circuit and a controller for reversing the motor therefrom, means for preventing the closing of either of said clutches when the said switch is closed, and means for preventing said clutch closure when the controller is set to reverse after closure of said switch.

5. A vehicle drive comprising in combination with an electrical drive, driving through a given set of driving wheels, a mechanical drive, driving through another set of driving wheels, a plurality of geared means between said mechanical drive and the driving elements of the electrical drive adapted to be made selectively operable to transmit motion when the said electrical drive is not operative.

6. A vehicle drive comprising in combination with an electric drive for a given set of driving wheels, a mechanical drive for another set of driving wheels, the mechanical drive being adapted to have a plurality of mechanical advantages, and means for selectively controlling said advantages.

7. A vehicle drive comprising in combination with an electric drive for a given set of driving wheels, a mechanical drive for another set of driving wheels, the mechanical drive being adapted to have a plurality of mechanical advantages, means for selectively controlling said advantages and means for selectively operating said drives.

8. A vehicle drive comprising in combination with an electric drive for a given set of driving wheels, a mechanical drive for another set of driving wheels, the mechanical drive being adapted to have a plurality of mechanical advantages, and means for selectively controlling said advantages, means for selectively operating said drives and an interlock adapted to prevent simultaneous operation of the drives.

9. A vehicle drive comprising in combination with an electric drive to at least one driving wheel, a mechanical drive to at least one other driving wheel, the mechanical drive being adapted to have a plurality of mechanical advantages.

10. The drive for vehicles having driving wheels comprising in combination a prime mover, an electric drive to at least one driving wheel operable from said prime mover, a mechanical drive to at least one other driving wheel and mechanical driving and connecting means between said mechanical drive and said prime mover, said mechanical driving and connecting means including two sets of constantly meshing transmission gears and selective means for making either one or the other of said sets operable to drive without disengaging the gears of a set.

11. The drive for vehicles having driving wheels comprising in combination a prime mover, an electric drive to at least one driving wheel operable from said prime mover, a mechanical drive to at least one other driving wheel and mechanical driving and connecting means between said mechanical drive and said prime mover, said mechanical driving and connecting means including two sets of constantly meshing transmission gears and selective means for making either one or the other of said sets operable to drive without disengaging the gears of a set, the said last-named means comprising clutch mechanisms associated with each respective gear set.

In testimony whereof, I have signed my name to this specification this 9th day of April, 1926.

THORVALD JENSEN.